United States Patent
Terasawa et al.

(10) Patent No.: US 12,528,356 B2
(45) Date of Patent: Jan. 20, 2026

(54) METHOD OF MANAGING POWER STORAGE AND POWER STORAGE MANAGEMENT SYSTEM, AND COMPUTER APPARATUS, VEHICLE, AND SERVER

(71) Applicant: TOYOTA JIDOSHA KABUSHIKI KAISHA, Toyota (JP)

(72) Inventors: Yuko Terasawa, Tokyo-to (JP); Makoto Kakuchi, Toyota (JP); Toshiaki Karasawa, Tokyo-to (JP); Takeshi Higashi, Nagoya (JP); Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/526,722

(22) Filed: Dec. 1, 2023

(65) Prior Publication Data

US 2024/0227566 A1 Jul. 11, 2024

(30) Foreign Application Priority Data

Jan. 11, 2023 (JP) ................. 2023-002522

(51) Int. Cl.
*B60L 3/00* (2019.01)
*B60L 53/80* (2019.01)

(52) U.S. Cl.
CPC .......... *B60L 3/0046* (2013.01); *B60L 3/0007* (2013.01); *B60L 3/0053* (2013.01); *B60L 53/80* (2019.02)

(58) Field of Classification Search
CPC .... B60L 3/0046; B60L 3/0007; B60L 3/0053; B60L 53/80; B60L 58/10; B60L 3/00
USPC ........................................... 701/22
See application file for complete search history.

(56) References Cited

U.S. PATENT DOCUMENTS

| | | | |
|---|---|---|---|
| 2013/0106594 A1* | 5/2013 | Hiramatsu | H02J 9/002 340/436 |
| 2016/0292937 A1* | 10/2016 | Taylor | G07C 5/008 |
| 2022/0111812 A1* | 4/2022 | Murakami | B60L 58/10 |

FOREIGN PATENT DOCUMENTS

JP 2022-064527 A 4/2022

* cited by examiner

*Primary Examiner* — Shardul D Patel
(74) *Attorney, Agent, or Firm* — Sughrue Mion, PLLC

(57) ABSTRACT

A method of managing a power storage includes determining whether or not a vehicle including a power storage has been involved in an accident, obtaining a degree of damage to the power storage when it is determined that the vehicle has been involved in the accident, and transmitting an emergency signal indicating the obtained degree of damage and a position of the vehicle involved in the accident to at least one of an emergency vehicle that deals with the accident and a management apparatus that instructs the emergency vehicle to be deployed.

17 Claims, 7 Drawing Sheets

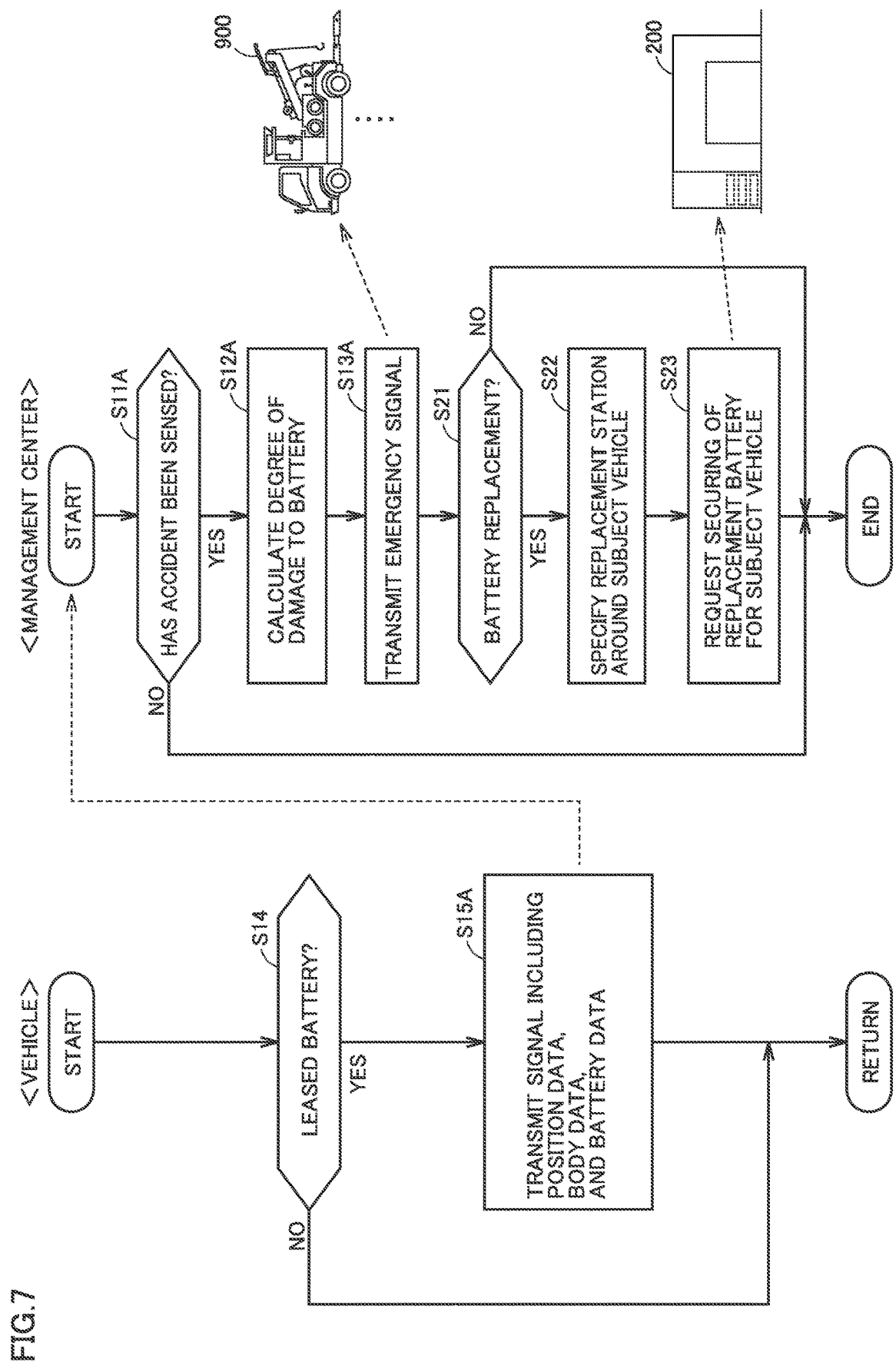

METHOD OF MANAGING POWER STORAGE AND POWER STORAGE MANAGEMENT SYSTEM, AND COMPUTER APPARATUS, VEHICLE, AND SERVER

CROSS REFERENCE TO RELATED APPLICATIONS

This nonprovisional application is based on Japanese Patent Application No. 2023-002522 filed with the Japan Patent Office on Jan. 11, 2023, the entire contents of which are hereby incorporated by reference.

BACKGROUND

Field

The present disclosure relates to a method of managing a power storage and a power storage management system, and a computer apparatus, a vehicle, and a server.

Description of the Background Art

Japanese Patent Laying-Open No. 2022-064527 discloses a technique to cause an electronic control unit driven by an auxiliary battery as a drive power supply to perform low-voltage-control exclusively on a battery cell in a battery module that is selected in advance in a case where magnitude of an impact detected by an impact detection sensor configured to detect magnitude of an impact applied to a vehicle is equal to or greater than a predetermined value.

SUMMARY

The impact detection sensor can detect occurrence of a vehicle accident. Japanese Patent Laying-Open No. 2022-064527, however, fails to disclose an impact on which part of the vehicle is detected by the impact detection sensor. According to paragraph [0022] of Japanese Patent Laying-Open No. 2022-064527, a lead battery becomes unusable when the impact detection sensor has detected an impact having a predetermined value or more. A vehicle-mounted battery, however, is not necessarily damaged when impactive force is applied to a body. Even when great impactive force is applied to the body, impactive force transmitted to the vehicle-mounted battery may be weak.

According to the technique described in Japanese Patent Laying-Open No. 2022-064527, it is difficult to appropriately convey a state of the vehicle involved in a vehicle accident to an emergency vehicle that deals with the accident on the occurrence of the accident.

The present disclosure was made to solve the problem above, and an object thereof is to appropriately convey a state of a vehicle (in particular, a state of a power storage included in the vehicle) involved in a vehicle accident to an emergency vehicle that deals with the accident on the occurrence of the accident.

According to a form according to a first point of view of the present disclosure, a method of managing a power storage shown below is provided.

(Clause 1) The method of managing a power storage includes determining whether a vehicle including a power storage has been involved in an accident, obtaining a degree of damage to the power storage when the vehicle is determined as having been involved in the accident, and transmitting an emergency signal indicating the obtained degree of damage and a position of the vehicle involved in the accident to at least one of an emergency vehicle that deals with the accident and a management apparatus that instructs the emergency vehicle to be deployed.

In the management method, when a vehicle is involved in an accident, a degree of damage to the power storage included in the vehicle is obtained and the emergency signal is transmitted to the emergency vehicle or the management apparatus thereof. The emergency vehicle or the management apparatus thereof can recognize the position of the vehicle involved in the accident and the degree of damage to the power storage based on the received emergency signal. When the management apparatus receives the emergency signal, the management apparatus may convey information indicated by the emergency signal to the emergency vehicle when it instructs the emergency vehicle to be deployed. Thus, according to the method, on the occurrence of a vehicle accident, a state of the vehicle (in particular, the state of the power storage included in the vehicle) involved in the accident can appropriately be conveyed to the emergency vehicle that deals with the accident.

Examples of the emergency vehicle include an ambulance, a fire engine, a tow car, and a police vehicle. The vehicle including the power storage may be an electrically powered vehicle (xEV) that uses electric power as the entirety or a part of a motive power source. Examples of the xEV include a battery electric vehicle (BEV), a hybrid electric vehicle (HEV), a plug-in hybrid electric vehicle (PHEV), and a fuel cell electric vehicle (FCEV).

The method of managing a power storage according to Clause 1 may be configured according to Clause 2 or 3 shown below.

(Clause 2) In the method according to Clause 1, the emergency signal further indicates a type of the power storage.

According to the method, the emergency vehicle recognizes in advance influence by the type of the power storage based on the emergency signal, so that the damage to the power storage is more readily appropriately dealt with at an accident site.

(Clause 3) In the method according to Clause 1 or 2, the emergency signal further indicates under which of a battery electric vehicle (BEV), a plug-in hybrid electric vehicle (PHEV), a hybrid electric vehicle (HEV), and a fuel cell electric vehicle (FCEV) a type of the vehicle involved in the accident falls.

According to the method, the emergency vehicle more readily appropriately deals with the vehicle accident depending on the type of the vehicle.

According to one form, a program that causes a computer to perform the method of managing a power storage according to any one of Clauses 1 to 3 is provided. In another form, a computer apparatus that distributes the program is provided.

According to a form according to a second point of view of the present disclosure, a computer apparatus shown below is provided.

(Clause 4) The computer apparatus includes a processor and a storage where a program causing the processor to perform the method of managing a power storage according to any one of Clauses 1 to 3 is stored.

According to the computer apparatus, the method of managing a power storage described previously is suitably performed.

According to a form according to a third point of view of the present disclosure, a power storage management system shown below is provided.

(Clause 5) The power storage management system includes the vehicle including the computer apparatus according to Clause 4 and a first server that provides a lease service for rental of a power storage for a vehicle. When the vehicle is determined as having been involved in the accident, the computer apparatus determines whether the power storage mounted on the vehicle is provided by the lease service, and when the power storage is determined as being provided by the lease service, the computer apparatus transmits to the first server, first damage information indicating the degree of damage.

According to the system, when a vehicle including a power storage rented by the lease service is involved in an accident, the vehicle (computer apparatus) transmits the first damage information to the first server that provides the lease service. The first server can thus recognize the degree of damage.

The power storage management system according to Clause 5 may include a feature according to any one of Clauses 6 to 8 shown below.

(Clause 6) The management system according to Clause 5 further includes a feature below. The management system further includes a plurality of replacement stations where a power storage for a vehicle is replaced. The first server determines whether the power storage mounted on the vehicle is to be replaced based on the first damage information, and when the first server determines that the power storage is to be replaced, the first server requests at least one of the replacement stations to secure a power storage that replaces the power storage.

According to the system, when replacement of the power storage mounted on the vehicle is necessitated, the replacement station more readily prepares the power storage for replacement early.

(Clause 7) The management system according to Clause 5 or 6 further includes a feature below. The management system further includes a second server that provides an insurance service relating to a damage to a power storage for a vehicle. When the first server receives the first damage information, the first server determines whether the power storage mounted on the vehicle is eligible for coverage by the insurance service, and when the first server determines that the power storage is eligible for coverage by the insurance service, the first server transmits to the second server, second damage information indicating the degree of damage. The first damage information and the second damage information may be the same or different.

According to the system, when a vehicle including a power storage eligible for coverage by the insurance service is involved in an accident, the second damage information is transmitted from the first server to the second server that provides the insurance service. The second server thus more readily provides the insurance service based on the degree of damage. Furthermore, a vehicle user more readily receives the insurance service. The insurance service is a service for compensation for a damage to the power storage mounted on the vehicle.

(Clause 8) The management system according to Clause 7 further includes a feature below. The second server is configured to perform, when the second server receives the second damage information, obtaining vehicle information representing a situation at the time of occurrence of the accident, determining a degree of negligence of a user of the vehicle in connection with the accident based on the obtained vehicle information, and determining insurance benefit to be paid by the insurance service based on the degree of damage and the degree of negligence.

According to the system, the insurance benefit is more readily appropriately determined based on the degree of damage to the power storage and the degree of negligence of the vehicle user in connection with the accident.

The second server may transmit the determined insurance benefit to at least one of the first server and a terminal of the user of the vehicle involved in the accident. The user terminal may be a vehicle-mounted terminal mounted on the vehicle or a portable terminal carried by the user of the vehicle. The user terminal may be registered in advance in at least one of the first server and the second server in association with the vehicle.

According to a form according to a fourth point of view of the present disclosure, a vehicle shown below is provided.

(Clause 9) A vehicle that performs the method of managing a power storage according to any one of Clauses 1 to 3 includes a body, a power storage mounted on the body, a first sensor that detects impactive force applied to the body, a second sensor that detects at least one of the impactive force applied to the power storage and a state of the power storage, a third sensor that detects a position of the vehicle, and a controller that performs the method for the power storage. The controller is configured to determine whether or not the vehicle has been involved in an accident based on a result of detection by the first sensor. The controller is configured to obtain a degree of damage to the power storage based on a result of detection by the second sensor. The controller is configured to obtain a position of the vehicle involved in the accident based on a result of detection by the third sensor when the controller determines that the vehicle has been involved in the accident.

According to the vehicle, the method of managing a power storage described previously is suitably performed.

According to a form according to a fifth point of view of the present disclosure, a server shown below is provided.

(Clause 10) A server that performs the method of managing a power storage according to any one of Clauses 1 to 3 is configured to determine whether the vehicle has been involved in an accident based on data on impactive force applied to a body, the data being obtained from the vehicle, and to obtain a degree of damage to the power storage based on data on the power storage obtained from the vehicle.

According to the server, the method of managing a power storage described previously is suitably performed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart showing a modification of processing shown in FIG. 3.

DESCRIPTION OF THE PREFERRED EMBODIMENTS

Figure 1:
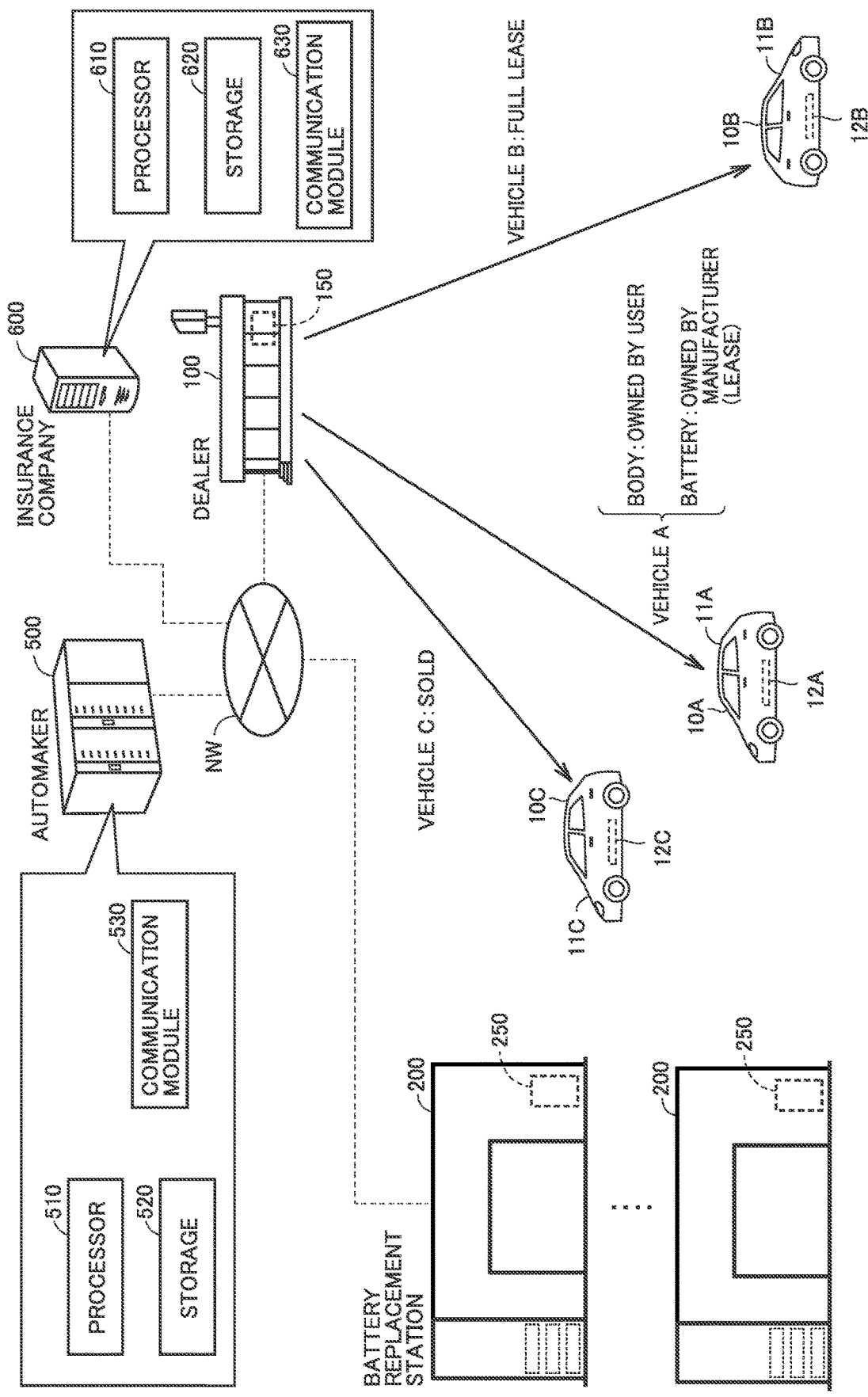
FIG. 1 is a diagram for illustrating overview of a power storage management system according to an embodiment of the present disclosure.

An embodiment of the present disclosure will be described in detail with reference to the drawings. The same or corresponding elements in the drawings have the same reference characters allotted and description thereof will not be repeated.

FIG. 1 is a diagram for illustrating overview of a power storage management system according to this embodiment. The management system shown in FIG. 1 includes a dealer 100, a battery replacement station (which is denoted as "BSta" below) 200, a management center 500, and an insurance server 600.

Management center 500 is a server that provides a lease service for rental of a power storage for a vehicle (for example, for an xEV). Management center 500 manages information on the lease service. Management center 500 belongs, for example, to an automaker. In this embodiment, the automaker also serves as a leasing company. Insurance server 600 is a server that provides an insurance service relating to a damage to the power storage for the vehicle (for example, for the xEV). Insurance server 600 manages information on the insurance service. Insurance server 600 belongs, for example, to an insurance company. Insurance server 600 provides, in coordination with management center 500, the insurance service relating to the damage to the power storage rented by the lease service. Management center 500 and insurance server 600 correspond to an exemplary "first server" and an exemplary "second server" according to the present disclosure, respectively.

In the lease service, a plurality of lease types including a partial lease type and a full lease type are adopted. The partial lease type refers to a lease type for rental only of a power storage for a vehicle. A user who rents the power storage in accordance with the partial lease type prepares by the user himself/herself, a portion (body portion) of the vehicle except for the power storage. The user can mount the power storage rented from the leasing company on the body owned by the user himself/herself. As the power storage is mounted on the body, the xEV can travel. When a partial lease contract is terminated, the user returns only the power storage to the leasing company. The full lease type, on the other hand, refers to a lease type for rental of the entire vehicle (that is, both of a body portion and a power storage). When a full lease contract is terminated, the user returns not only the power storage but also the entire vehicle to the leasing company.

Dealer 100 includes a server 150. The automaker sells or leases a vehicle through dealer 100. Dealer 100 not only sells vehicles manufactured by the automaker but also provides the lease service described previously. Server 150 manages information (vehicle information) on the vehicle sold or leased by dealer 100 as being distinguished based on a vehicle ID. Server 150 then transmits latest vehicle information to management center 500 in response to a request from management center 500 or each time the vehicle information is updated. Dealer 100 rents at least one of the body and the power storage provided by the automaker. Dealer 100 may rent a power storage 12A of a vehicle 10A shown in FIG. 1 to a user, for example, in accordance with the partial lease type. In this case, vehicle 10A corresponds to a partial lease vehicle (which may be denoted as a "vehicle A" below) and a body 11A of vehicle 10A is a property of the user. Power storage 12A of vehicle 10A is provided to the user by lease and it is a property of the automaker. Alternatively, dealer 100 may rent a vehicle 10B shown in FIG. 1 to a user, for example, in accordance with the full lease type. In this case, vehicle 10B corresponds to a full lease vehicle (which may be denoted as a "vehicle B" below). The entire vehicle 10B (a body 11B and a power storage 12B) is provided to the user by lease and it is a property of the automaker. Dealer 100 may sell, for example, a vehicle 10C shown in FIG. 1 to a user. In this case, vehicle 10C corresponds to a sold vehicle (which may be denoted as a "vehicle C" below). The entire vehicle 10C (a body 11C and a power storage 12C) is sold to the user and becomes a property of the user.

In this embodiment, a lease fee (for example, a monthly lease fee) charged by dealer 100 to a vehicle user includes an insurance fee. The vehicle leased by dealer 100 is covered by an insurance (more specifically, an insurance relating to a damage to the power storage) provided by insurance server 600. Specifically, a damage to the power storage mounted on each of vehicles A and B is covered by the insurance. The insurance service compensates for the damage to the power storage. Though details will be described later, insurance server 600 determines insurance benefit to be paid by the insurance service and notifies management center 500 of the determined insurance benefit. The determined insurance benefit is paid by the insurance company to the leasing company. When an amount of loss caused by the damage to the power storage is greater than the insurance benefit, the leasing company charges the difference to the vehicle user. Since the insurance is directed to the lease, vehicle C does not buy such an insurance. Vehicle C may buy another insurance.

BSta 200 is configured to replace the power storage for the vehicle (for example, for the xEV). BSta 200 includes a server 250. In this embodiment, a battery (more specifically, a secondary battery) is adopted as the power storage. The power storage should only be an apparatus where electric power can be stored, and examples of the power storage include a large-capacity capacitor other than the secondary battery.

The power storage management system according to this embodiment includes a plurality of BSta's 200. These BSta's 200 are provided at bases in an area (management area) managed by the management system so as to construct a network of battery replacement bases that covers the entire management area. Each BSta 200 may function as a vehicle repair garage. Each BSta 200 may be configured to repair the body. Though FIG. 1 shows only a single dealer 100, the management system may include a plurality of dealers 100. These dealers 100 may be provided at bases in the management area so as to construct a network of sales/lease bases that covers the entire area managed by the management system. Dealer 100 and BSta 200 may be provided at the same location (or in the vicinity).

Management center 500 includes a processor 510, a storage 520, and a communication module 530. Insurance server 600 includes a processor 610, a storage 620, and a communication module 630. Each of processors 510 and 610 includes, for example, a central processing unit (CPU). Each of storages 520 and 620 is configured such that information put thereinto can be stored therein. Each of storages 520 and 620 may include a hard disk (HD) drive or a solid state drive (SSD). Each of communication modules 530 and 630 is connected to a communication network NW, for example, through a wire. Each of servers 150 and 250 is also connected to communication network NW, for example, through a wire. Management center 500, insurance server 600, server 150, and server 250 are configured to communicate with one another over communication network NW. Communication network NW is a wide range network constructed, for example, of the Internet and a wireless base station. Communication network NW may include a cellular network.

Figure 2:
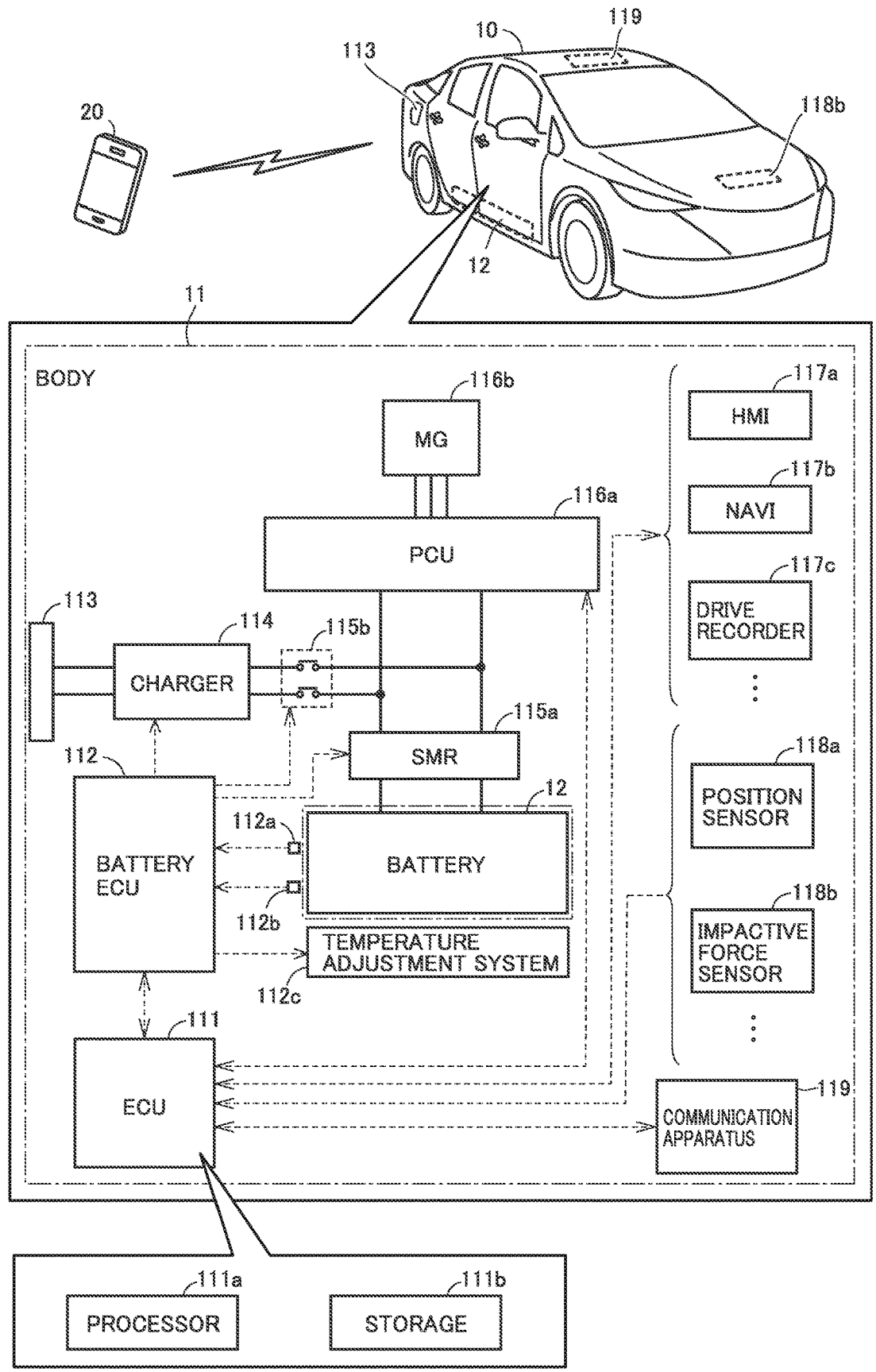
FIG. 2 is a diagram for illustrating a configuration of a vehicle shown in FIG. 1.

A vehicle provided by dealer 100 may be referred to as a "vehicle 10" below. Vehicle 10 according to this embodiment is one of vehicles A, B, and C shown in FIG. 1. FIG. 2 is a diagram for illustrating a configuration of vehicle 10.

Referring to FIG. 2, vehicle 10 includes body 11 and battery 12 mounted on body 11. Vehicle 10 is configured to travel with electric power stored in battery 12. A known power storage for a vehicle (for example, a liquid secondary battery or an all-solid-state secondary battery) can be adopted as battery 12. Examples of the secondary battery for the vehicle include a lithium ion battery and a nickel metal hydride battery. A plurality of secondary batteries may form a battery assembly. Battery 12 corresponds to an exemplary "power storage" according to the present disclosure.

Body 11 includes an ECU 111, a battery ECU 112, a battery management system (BMS) 112a, a strain sensor 112b, a temperature adjustment system 112c, an inlet 113, a charger 114, a system main relay (SMR) 115a, a charging relay 115b, a power control unit (PCU) 116a, a motor generator (MG) 116b, a human machine interface (HMI) 117a, a navigation system (which is denoted as "NAVI" below) 117b, a drive recorder 117c, a position sensor 118a, an impactive force sensor 118b, and a communication apparatus 119. The ECU stands for an electronic control unit. A control system including each ECU mounted on body 11 is supplied with electric power from a not-shown auxiliary battery.

ECU 111 is a computer including a processor 111a and a storage 111b. Not only a program to be executed by processor 111a but also information (for example, a map, a mathematical expression, and various parameters) used in the program are stored in storage 111b. Various types of information on vehicle 10 are further held in storage 111b. Such information is updated in accordance with a status of vehicle 10. In this embodiment, various types of vehicle control by ECU 111 are carried out by execution by processor 111a, of the program stored in storage 111b. Though FIG. 2 does not show a configuration of battery ECU 112, battery ECU 112 is also a computer similar in hardware configuration to ECU 111. ECU 111 and battery ECU 112 are configured to communicate with each other. These ECUs are connected to each other, for example, over controller area network (CAN).

Battery management system (BMS) 112a includes a sensor that detects a state (for example, a temperature, a current, and a voltage) of battery 12. Strain sensor 112b detects a degree of strain of a casing of battery 12 (battery casing). As impactive force applied to battery 12 is greater, a degree of strain of the battery casing is higher. Strain sensor 112b may be implemented by a strain gauge or a displacement sensor. A result of detection by each of BMS 112a and strain sensor 112b is outputted to battery ECU 112.

Temperature adjustment system 112c adjusts a temperature of battery 12. Temperature adjustment system 112c may include at least one of a heater and a cooling apparatus. Cooling may be water cooling. Temperature adjustment system 112c is controlled by battery ECU 112.

Vehicle 10 is configured as being externally chargeable (charging of battery 12 with electric power from the outside of the vehicle). Inlet 113 is constructed such that a plug (for example, a connector of a charging cable) of electric vehicle supply equipment (EVSE) is attachable thereto and removable therefrom. Charger 114 includes a power conversion circuit for external charging. Charger 114 may include at least one of a direct-current (DC)/DC conversion circuit and an alternating-current (AC)/DC conversion circuit. Charging relay 115b switches between connection and disconnection of a charging line. In the example shown in FIG. 2, the charging line including inlet 113, charger 114, and charging relay 115b is connected between SMR 115a and PCU 116a. Without being limited as such, the charging line may be connected between battery 12 and SMR 115a. The configuration shown in FIG. 2 may be modified to carry out external power feed (power feed from battery 12 to the outside of the vehicle). For example, charger 114 shown in FIG. 2 may be changed to a charger-discharger.

SMR 115a switches between connection and disconnection of an electrical path from battery 12 to PCU 116a. While vehicle 10 travels, SMR 115a is connected and charging relay 115b is disconnected. When electric power is exchanged between battery 12 and inlet 113, both of SMR 115a and charging relay 115b are connected. Each of charger 114, SMR 115a, and charging relay 115b is controlled by battery ECU 112. Battery ECU 112 receives a control command from ECU 111.

PCU 116a drives MG 116b with electric power supplied from battery 12. PCU 116a includes, for example, an inverter and a DC/DC converter. PCU 116a is controlled by ECU 111. MG 116b functions as a motor for travel of vehicle 10. MG 116b is driven by PCU 116a and rotates a drive wheel of vehicle 10. MG 116b carries out regeneration and outputs generated electric power to battery 12. Vehicle 10 may include any number of motors for travel.

HMI 117a includes an input device and a display device. HMI 117a may include a touch panel display. HMI 117a may include a meter panel and/or a head-up display. HMI 117a may include a smart speaker that accepts an audio input.

NAVI 117b includes a touch panel display, a global positioning system (GPS) sensor, a processor, and a storage where map information is stored. The map information indicates a position of each dealer 100 and a position of each BSta 200. The map information may sequentially be updated by over the air (OTA). NAVI 117b detects a position of vehicle 10 with the GPS sensor, and shows the position of vehicle 10 in real time on the map based on the map information. NAVI 117b searches for a route for finding an optimal route (for example, a shortest route) from the current position to a destination of vehicle 10 by referring to the map information.

Drive recorder 117c includes a camera that obtains video images of surroundings of vehicle 10, a storage where the video images obtained by the camera are stored, and an acceleration sensor (G sensor) that detects an acceleration of vehicle 10. Drive recorder 117c constantly records the video images of the surroundings of vehicle 10. When an amount of information of the video images recorded in the storage exceeds a capacity of the storage, old video images are erased by overwriting with latest video images. Therefore, video images to be stored for a long time (for example, accident data which will be described later) among video images obtained by drive recorder 117c are stored in ECU 111 (storage 111b).

Position sensor 118a detects a position of vehicle 10. Impactive force sensor 118b detects impactive force applied to body 11 (for example, a body shell). Impactive force sensor 118b may be configured to detect impactive force with at least one of the acceleration sensor, the strain gauge, and the displacement sensor.

Communication apparatus 119 includes a communication interface (I/F) for access to communication network NW through wireless communication. Communication apparatus 119 may include a telematics control unit (TCU) or a data communication module (DCM) for wireless communication. Communication apparatus 119 further includes a communication I/F for wireless communication with each of server 250 (FIG. 1) and portable terminal 20. ECU 111 is configured to communicate with each of management center 500 (FIG. 1), server 250, and portable terminal 20 through communication apparatus 119. ECU 111 may communicate with each of server 150 and insurance server 600 (FIG. 1) through communication apparatus 119.

Portable terminal 20 is configured as being portable by the user. Portable terminal 20 is operated while it is carried by the user (vehicle manager) of vehicle 10. In this embodiment, a smartphone equipped with a touch panel display is adopted as portable terminal 20. The smartphone contains a computer and performs a speaker function. Without being limited as such, any terminal portable by the user of vehicle 10 can be adopted as portable terminal 20. For example, a laptop computer, a tablet terminal, a portable game console, a wearable device (a smartwatch, smartglasses, smart gloves, or the like), and an electronic key can also be adopted as portable terminal 20.

Application software (which is referred to as a "mobile app" below) for using a service provided by management center 500 is installed in portable terminal 20. With the mobile app, identification information (a terminal ID) of portable terminal 20 is registered in management center 500 in association with identification information (a vehicle ID) of corresponding vehicle 10. Portable terminal 20 can exchange information with management center 500 through the mobile app. Portable terminal 20 may be configured to communicate with each of insurance server 600, server 250, and server 150 (FIG. 1).

In vehicle 10, ECU 111 carries out integrated control of the entire vehicle. ECU 111 obtains results of detection from various sensors (including position sensor 118a and impactive force sensor 118b) mounted on vehicle 10. ECU 111 obtains information also from each of battery ECU 112, HMI 117a, NAVI 117b, drive recorder 117c, and communication apparatus 119. Battery ECU 112 obtains a state (for example, a temperature, a current, a voltage, an SOC, and an SOH) of battery 12 based on an output from BMS 112a and outputs the obtained state of battery 12 to ECU 111. Vehicle information obtained by ECU 111 is stored in storage 111b.

The vehicle information held in vehicle 10 (storage 111b) includes vehicle type information, use form information, and battery information. Vehicle 10 transmits the latest vehicle information to management center 500 together with the vehicle ID of the vehicle itself in response to a request from management center 500 or each time the vehicle information is updated. The vehicle ID may be a vehicle identification number (VIN).

The vehicle type information indicates under which of a battery electric vehicle (BEV), a plug-in hybrid electric vehicle (PHEV), a hybrid electric vehicle (HEV), and a fuel cell electric vehicle (FCEV) the type of vehicle 10 falls. The use form information indicates a form of use of vehicle 10. In this embodiment, the use form information indicates the form of use of one of vehicle A (partial lease vehicle), vehicle B (full lease vehicle), and vehicle C (sold vehicle). For example, dealer 100 writes the vehicle type information and the use form information on vehicle 10 into each of the storage (not shown) of server 150 and storage 111b of vehicle 10 when it sells or leases vehicle 10.

The battery information held in vehicle 10 corresponds to information on battery 12 while it is mounted on vehicle 10. The battery information includes identification information (battery ID), specifications (for example, a constituent material, a capacity in an initial state, charging performance, and discharging performance), a state of charge (SOC), and a state of health (SOH).

The battery information indicates a type of battery 12. The battery information includes, for example, a material for an electrolyte for battery 12. The battery information may further include an electrode material for battery 12. The power storage for the vehicle is different in degree of influence by the material depending on the constituent material (in particular, the material for the electrolyte). For example, a cell for which a solid electrolyte is adopted tends to be less affected by the electrolyte than a cell for which a liquid electrolyte is adopted. A cell for which an aqueous liquid electrolyte is adopted tends to be less affected by the electrolyte than a cell for which an organic liquid electrolyte is adopted.

The SOC represents a remaining amount of stored power, and corresponds to a ratio of a current amount of stored power to an amount of stored power in a fully charged state. The SOH represents a level of health or a degree of deterioration. Examples of the SOH include a capacity retention ratio and an internal resistance. A higher internal resistance of the power storage means a higher degree of deterioration of the power storage. A lower capacity retention ratio of the power storage means the higher degree of deterioration of the power storage. The capacity retention ratio of the power storage corresponds to a ratio of a current capacity of the power storage to the capacity of the power storage in the initial state (a state where the power storage is not deteriorated). The capacity of the power storage corresponds to the amount of stored power in the fully charged state.

When vehicle 10 is involved in an accident, accident data indicating a status of vehicle 10 at that time is stored in storage 111b. The accident data may include video images showing the status of vehicle 10 on the occurrence of the accident. Such video images are obtained, for example, by drive recorder 117c, and stored in storage 111b when vehicle 10 is involved in the accident.

Referring again to FIG. 1, the power storage management system according to this embodiment includes a plurality of dealers 100, a plurality of BSta's 200, and a plurality of vehicles 10. The management system further includes a plurality of portable terminals 20 carried by users of vehicles 10. Management center 500 is configured to communicate with each of server 150 of dealer 100 provided at each base and server 250 of the battery replacement station (BSta 200) provided at each base. Management center 500 is configured to communicate also with each vehicle 10 sold or leased by any dealer 100 and portable terminal 20 corresponding to each vehicle 10.

Identification information (vehicle ID) of each vehicle 10 sold or leased by dealer 100 at each base is registered in advance in management center 500. Information on each vehicle 10 (vehicle information) is stored in storage 520 of management center 500 as being distinguished based on the vehicle ID. A latest value of a parameter that changes over time in the vehicle information is sequentially transmitted from each vehicle 10 to management center 500, and transition of such a parameter value is recorded in management center 500. In order to lower a frequency of communication, each vehicle 10 may collectively transmit data (for example, each parameter value recorded in association with time) recorded during a certain period to management center 500 when that period elapses.

The vehicle information held in management center 500 includes vehicle type information, use form information, battery information, and fee information. Management center 500 obtains the vehicle type information, the use form information, and the battery information described previously from each vehicle 10.

The fee information corresponds to information on a lease fee paid by the vehicle user to the leasing company (automaker). The lease fee corresponds to a fee paid by the user for rental use of the vehicle or the battery. In this embodiment, the lease fee includes the insurance fee. In other words, the vehicle user who has paid the lease fee has the right to receive the insurance service described previously.

Figure 3:
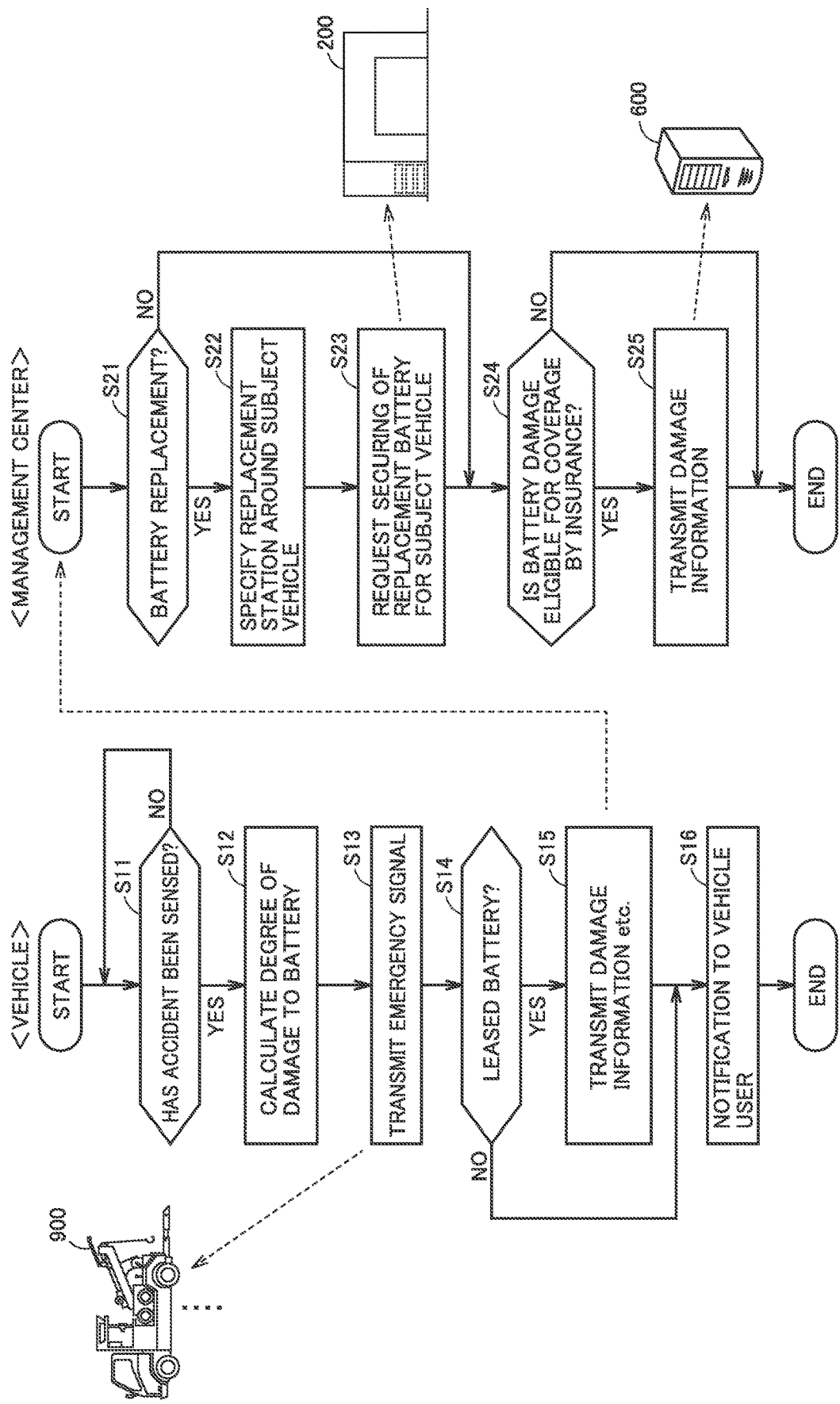
FIG. 3 is a flowchart showing control on the occurrence of an accident in a method of managing a power storage according to the embodiment of the present disclosure.

FIG. 3 is a flowchart showing control on the occurrence of an accident in a method of managing a power storage according to this embodiment. Each step in the flowchart is simply denoted as "S" below.

For example, when ECU 111 of vehicle 10 is started up, started-up ECU 111 starts a series of processing from S11 to S16 which will be described below. ECU 111 is started up, for example, in response to an operation onto a start-up switch of vehicle 10. In general, the start-up switch is referred to as a "power switch," an "ignition switch," or the like. The series of processing from S11 to S16 is performed for any period. For example, ECU 111 may perform such processing only while vehicle 10 is traveling. In the processing shown in FIG. 3, vehicle 10 that performs the series of processing from S11 to S16 is referred to as a "subject vehicle."

Referring to FIG. 3 together with FIGS. 1 and 2, in S11, ECU 111 of the subject vehicle determines whether or not the subject vehicle has been involved in an accident. For example, when impactive force detected by impactive force sensor 118*b* exceeds a prescribed threshold value (which is denoted as "Th1" below), ECU 111 determines that the subject vehicle has been involved in the accident. In this case, accident data (for example, video images in drive recorder 117*c*) indicating the status of the subject vehicle before and after the accident is stored in storage 111*b*. When impactive force detected by impactive force sensor 118*b* is equal to or smaller than Th1, on the other hand, ECU 111 determines that the subject vehicle has not been involved in the accident. When it is determined that the accident has not occurred (NO in S11), the process does not proceed to S12 or later and determination in S11 is repeated. The acceleration sensor of drive recorder 117*c* instead of impactive force sensor 118*b* may be used for detection of impactive force.

When it is determined that an accident has occurred (YES in S11), in S12, ECU 111 obtains a degree of damage to battery 12 mounted on the subject vehicle. In this embodiment, ECU 111 obtains the degree of damage to battery 12 based on at least one of a degree of a physical damage to the casing of battery 12 (for example, a degree of strain of the battery casing detected by strain sensor 112*b*), a communication level (for example, instability of communication, disconnection of communication, or the like) in connection with a system that monitors battery 12, a degree of damage to an electrical component (for example, break, deformation of a bus bar, or the like) of battery 12, and a degree of damage to an environmental system (for example, poor control, failure, or the like) of battery 12. In this embodiment, each of battery ECU 112 and BMS 112*a* functions as the system that monitors battery 12. Temperature adjustment system 112*c* functions as the environmental system of battery 12. ECU 111 may score the degree of damage for each assessment item in connection with the degree of damage to battery 12 and may handle a total value of scores for assessment items as the degree of damage (a result of assessment) of battery 12. The four assessment items (the casing, the communication level, the electrical component, and the environmental system) described above may be adopted as assessment items.

How to obtain the degree of damage to battery 12 is not limited to the method described above, and any method can be adopted. For example, ECU 111 may calculate the degree of damage to battery 12 caused by the accident based on change in characteristic (for example, a degree of lowering in capacity retention ratio or a degree of increase in internal resistance) of battery 12 between before and after the accident.

In following S13, ECU 111 of the subject vehicle (the vehicle involved in the accident) obtains the current position (a position of an accident site) of the subject vehicle and transmits an emergency signal including the obtained vehicle position information and battery damage information (S12) to at least one emergency vehicle 900. Specifically, ECU 111 generates the emergency signal, for example, from the vehicle type information and the battery information held in the subject vehicle, current position information of the subject vehicle detected by position sensor 118*a*, and the degree of damage to battery 12 obtained in S12. Such an emergency signal indicates the type of the subject vehicle, the position of the subject vehicle, the degree of damage to battery 12, and the type of battery 12. The method of detecting a position can be modified as appropriate. The GPS sensor of NAVI 117*b* instead of position sensor 118*a* may be used for position detection.

Emergency vehicle 900 is a vehicle that deals with an accident. Emergency vehicle 900 that receives the emergency signal includes at least one (for example, all) of an ambulance, a fire engine, a tow car, and a police vehicle. When the degree of damage to battery 12 is low to such an extent that the subject vehicle is able to travel, ECU 111 does not transmit the emergency signal to the tow car, and when the degree of damage to battery 12 is high to such an extent that the subject vehicle is unable to travel, it may transmit the emergency signal to the tow car.

In this embodiment, the emergency signal is transmitted from the subject vehicle to emergency vehicle 900. Therefore, emergency vehicle 900 can recognize the position of the subject vehicle (the vehicle involved in the accident) and the degree of damage to battery 12 based on the received emergency signal. Thus, according to processing in S11 to S13, on the occurrence of the vehicle accident, a state of the subject vehicle (in particular, the state of battery 12 included in the subject vehicle) can appropriately be conveyed to emergency vehicle 900 that deals with the accident.

In this embodiment, the emergency signal indicates the type of battery 12 mounted on the subject vehicle. Specifically, the material for the electrolyte indicates influence depending on the type of battery 12. For example, influence depending on the type of battery 12 for which an organic liquid electrolyte, an aqueous liquid electrolyte, or a solid electrolyte is adopted may be assessed in three levels of high, intermediate, and low. In this embodiment, emergency vehicle 900 more readily appropriately deals with the damage to battery 12 at the accident site by recognizing in advance the influence depending on the type of battery 12 based on the emergency signal. Any information indicating the type of the power storage may be applicable, without being limited to the material for the electrolyte. In addition, the way of assessment is not limited to assessment in three levels, and assessment in two levels or at least four levels may be made.

In this embodiment, the emergency signal indicates the type of the subject vehicle (one of the BEV, the PHEV, the HEV, and the FCEV). Though the BEV does not include an internal combustion engine, each of the PHEV and the HEV includes the internal combustion engine. Though each of the BEV and the PHEV performs an external charging function, the HEV does not perform the external charging function. The external charging function is a function to charge the power storage mounted on the vehicle with electric power from the outside of the vehicle. The capacity of the power storage mounted on the vehicle tends to be high in the descending order of the BEV, PHEV, and the HEV. The BEV, the PHEV, and the HEV are different in way of dealing with an accident due to such a difference in characteristic. The FCEV includes an apparatus where fuel (for example, hydrogen) is stored. Therefore, the FCEV is different from other electrically powered vehicles (the BEV, the PHEV, and the HEV) in way of dealing with an accident. With the emergency signal, emergency vehicle 900 more readily appropriately deals with a vehicle accident depending on the type of the subject vehicle.

In this embodiment, ECU 111 of the subject vehicle directly transmits the emergency signal to emergency vehicle 900. Without being limited as such, ECU 111 may transmit the emergency signal to a management apparatus (not shown) that instructs emergency vehicle 900 to be deployed, in addition to or instead of emergency vehicle 900. For example, ECU 111 may request deployment of the fire engine by transmitting the emergency signal to a server (management apparatus) of the fire department that instructs the fire engine to be deployed. The management apparatus (for example, the server) may convey information indicated in the emergency signal to emergency vehicle 900 when it instructs emergency vehicle 900 to be deployed in response to the emergency signal. The management apparatus may have emergency vehicle 900 head for the accident site based on the position information indicated in the emergency signal. Emergency vehicle 900 or the management apparatus thereof may notify a worker (for example, a terminal carried by the worker) of equipment for appropriately dealing with the accident based on at least one of the type of battery 12 (or a value of assessed influence depending on the type thereof) indicated by the emergency signal and the degree of damage to battery 12.

In following S14, ECU 111 determines whether or not battery 12 mounted on the subject vehicle is provided by the lease service. ECU 111 may determine under which of vehicles A to C (FIG. 1) the subject vehicle falls, for example, based on the use form information. When the subject vehicle falls under vehicle A or vehicle B, it is determined that battery 12 of the subject vehicle is provided by the lease service (YES in S14) and the process proceeds to S15.

In S15, ECU 111 transmits a signal (which is also referred to as a "first management signal" below) including information for management of battery 12 to management center 500 together with identification information (vehicle ID) of the subject vehicle. The first management signal includes information on the current position of the subject vehicle detected by position sensor 118a and damage information (first damage information) indicating the degree of damage to battery 12 obtained in S12. When the subject vehicle including battery 12 rented under the lease service is involved in an accident, the first damage information is transmitted from the subject vehicle to management center 500 in processing in S15. Management center 500 can thus recognize the degree of damage.

When the processing in S15 is performed, the process proceeds to S16. When the subject vehicle falls under vehicle C, it is determined that battery 12 of the subject vehicle is not provided by the lease service (NO in S14), and the process proceeds to S16 without the processing in S15 being performed.

In S16, ECU 111 gives the vehicle user a notification for post-accident handling. Specifically, ECU 111 may control the user terminal such that the user terminal (for example, at least one of HMI 117a and portable terminal 20) of the subject vehicle shows a prescribed manual (for example, an accident handling manual).

ECU 111 may determine contents of the manual to be shown on the user terminal based on at least one of the information (use form information) indicating under which of vehicles A to C (FIG. 1) the subject vehicle falls and the degree of damage to battery 12 obtained in S12. For example, when the degree of damage to battery 12 is low to such an extent that the subject vehicle is able to travel, ECU 111 may have the user terminal show that the subject vehicle is able to travel. When the degree of damage to battery 12 is high to such an extent that the subject vehicle is unable to travel, on the other hand, ECU 111 may have the user terminal show that the subject vehicle is unable to travel. When the subject vehicle falls under vehicle C, ECU 111 may have the user terminal show a position of a garage other than BSta 200. When the subject vehicle falls under vehicle A or vehicle B, ECU 111 may have the user terminal show a position of at least one BSta 200 (more specifically, a battery replacement station also serving as a body repair garage) present around the subject vehicle. At least one BSta 200 present around the subject vehicle may be a single BSta 200 closest to the subject vehicle or at least one BSta 200 present within a prescribed distance from the position of the subject vehicle. When processing in S16 is performed, the series of processing from S11 to S16 by the subject vehicle ends.

When management center 500 receives the first management signal and the vehicle ID (S15) described previously, it starts a series of processing from S21 to S25 which will be described below. In S21, management center 500 determines whether or not to replace battery 12 mounted on the subject vehicle based on the first damage information included in the first management signal. Management center 500 may determine whether or not battery 12 should be replaced based on magnitude of the degree of damage. In this embodiment, management center 500 determines to replace battery 12 when the degree of damage to battery 12 exceeds a prescribed threshold value (which is denoted as "Th2" below). When the degree of damage to battery 12 is equal to or smaller than Th2, management center 500 determines not to replace battery 12.

When it is determined to replace battery 12 (YES in S21), in S22, management center 500 specifies at least one BSta 200 present around the subject vehicle based on the position information included in the first management signal. At least one BSta 200 present around the subject vehicle may be a single BSta 200 closest to the subject vehicle or at least one BSta 200 present within a prescribed distance from the position of the subject vehicle.

In succession, in S23, management center 500 requests server 250 of BSta 200 specified in S22 to secure a power storage (replacement battery) that replaces battery 12 mounted on the subject vehicle. Specifically, management center 500 makes the request to server 250 by extracting information (for example, the battery ID and the specifications) on battery 12 of the subject vehicle from a database stored in storage 520 based on the identification information (vehicle ID) of the subject vehicle and transmitting a signal (which is also referred to as a "battery request signal" below) including the extracted battery information to server 250. Server 250 that has received this request determines whether or not inventory of replacement batteries requested by management center 500 is insufficient. When it is determined that the inventory of the replacement batteries is insufficient, server 250 requests a warehouse nearby or another BSta 200 to provide the replacement battery (the power storage for the subject vehicle). The replacement battery is thus secured at BSta 200 that has received the battery request signal from management center 500.

As set forth above, management center 500 determines whether or not to replace battery 12 mounted on the subject vehicle based on the first damage information (S21). When it is determined to replace battery 12, management center 500 then requests at least one replacement station to secure the power storage that replaces battery 12 (S23). According to such a configuration, when replacement of battery 12 mounted on the subject vehicle is necessitated, BSta 200 more readily prepares the power storage for replacement (that is, the power storage compatible with the power storage mounted on the subject vehicle) early.

In processing in S23, management center 500 permits BSta 200 that has received the battery request signal to replace the power storage (battery 12) of the subject vehicle. The battery ID included in the battery request signal is registered in server 250. Battery replacement is thus reserved in server 250. Server 250 specifies a battery to be replaced based on the battery ID included in the battery request signal. When the battery is not replaced even after lapse of a prescribed period since reservation of battery replacement, the reservation is canceled.

When the processing in S23 is performed, the process proceeds to S24. When it is determined not to replace battery 12 (NO in S21), the process proceeds to S24 without the processing in S21 to S23 being performed.

In S24, management center 500 determines whether or not battery 12 mounted on the subject vehicle is eligible for coverage by the insurance service. Specifically, management center 500 extracts the use form information of the subject vehicle from the database stored in storage 520 based on the identification information (vehicle ID) of the subject vehicle. Management center 500 then determines under which of vehicles A to C (FIG. 1) the subject vehicle falls based on the extracted use form information. When the subject vehicle falls under vehicle A or vehicle B and the degree of damage (first damage information) to battery 12 mounted on the subject vehicle exceeds a prescribed threshold value (which is denoted as "Th3" below), an insurance coverage eligibility condition is satisfied, and otherwise, the insurance coverage eligibility condition is not satisfied. Th3 represents the threshold value that defines the scope of coverage by the insurance, and may be defined in advance in an insurance contract. The degree of damage to battery 12 not exceeding Th3 means that the degree of damage has not reached an insurance eligibility coverage level.

When the insurance coverage eligibility condition is satisfied, battery 12 is determined as being eligible for coverage by the insurance service (YES in S24) and the process proceeds to S25. In S25, management center 500 transmits a signal (which is also referred to as a "second management signal" below) including damage information (second damage information) indicating the degree of damage to battery 12 mounted on the subject vehicle to insurance server 600 together with the identification information (vehicle ID) of the subject vehicle.

Thus, when management center 500 receives the first management signal (first damage information), it determines whether or not battery 12 mounted on the subject vehicle is eligible for coverage by the insurance service (S24). When it is determined that battery 12 of the subject vehicle is eligible for coverage by the insurance service, management center 500 transmits the second management signal including the second damage information to insurance server 600 (S25). According to such a configuration, when the vehicle including the power storage covered by the insurance service is involved in an accident, management center 500 transmits the second damage information to insurance server 600 that provides the insurance service. Insurance server 600 thus more readily provides the insurance service based on the degree of damage. Furthermore, the vehicle user more readily receives the insurance service.

When the processing in S25 is performed, the series of processing from S21 to S25 by management center 500 ends. When the insurance coverage eligibility condition described previously is not satisfied, battery 12 is determined as not being eligible for coverage by the insurance service (NO in S24), and the series of processing from S21 to S25 by management center 500 ends without the processing in S25 being performed.

Figure 4:
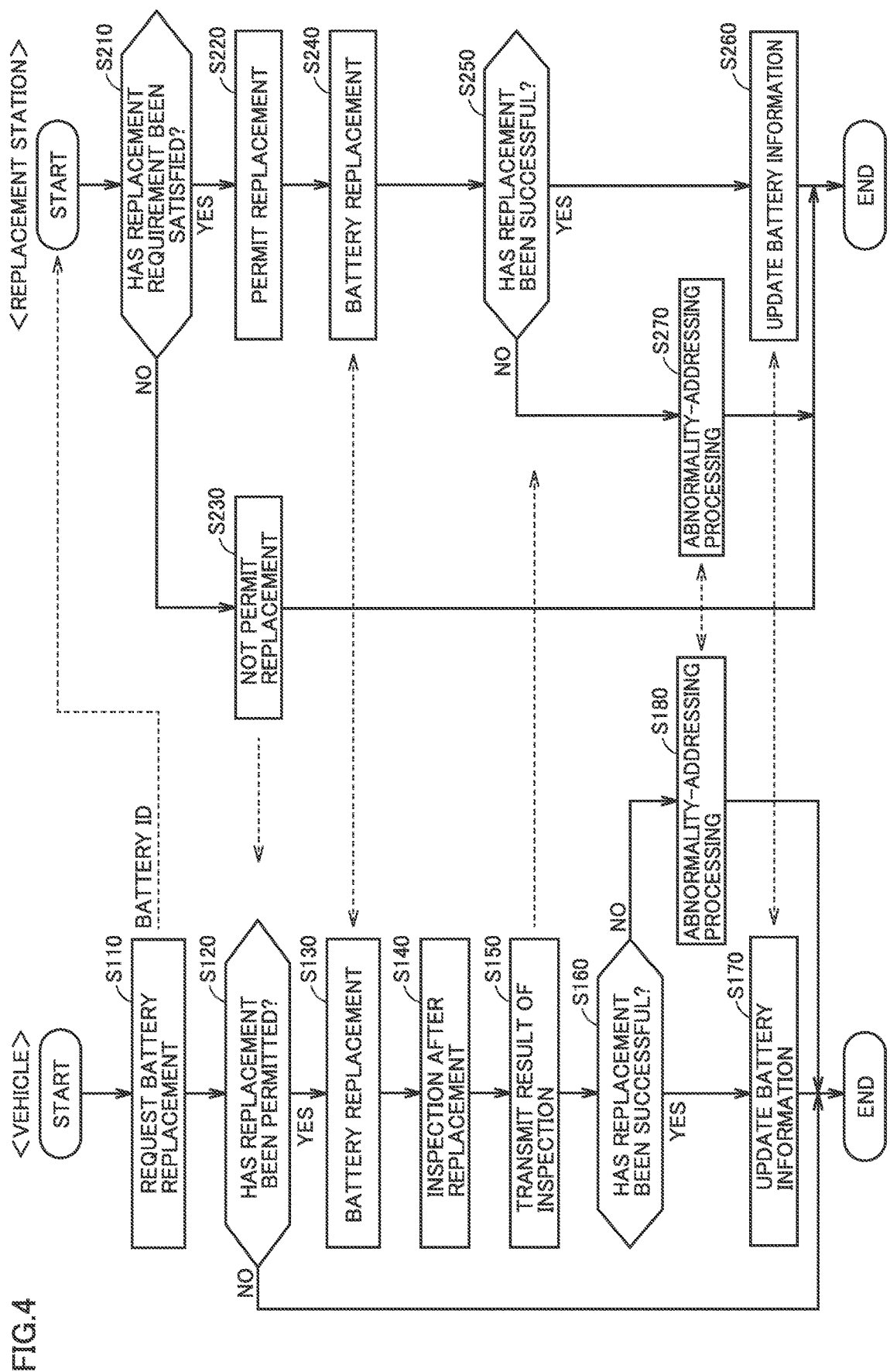
FIG. 4 is a flowchart showing processing involved with battery replacement performed by a vehicle and a replacement station terminal in the method of managing a power storage according to the embodiment of the present disclosure.

After handling of the accident by emergency vehicle 900, the subject vehicle (the vehicle involved in the accident) arrives at BSta 200 (for example, BSta 200 closest to the accident site) present around the accident site by traveling by the vehicle itself or being carried by the tow car. Battery 12 mounted on the subject vehicle is then replaced at BSta 200. FIG. 4 is a flowchart showing processing involved with battery replacement performed by vehicle 10 and a battery replacement station terminal (server 250).

Referring to FIG. 4 together with FIGS. 1 and 2, a series of processing from S110 to S180 is performed by ECU 111 of the subject vehicle. A series of processing from S210 to S270 is performed by server 250. Server 250 is configured to wirelessly communicate with the subject vehicle and obtains battery information from the subject vehicle. Server 250 and the subject vehicle may establish short-range communication, for example, through a wireless local area network (LAN) or communicate over communication network NW.

After the subject vehicle arrives at BSta 200, in S110, it transmits a signal that requests battery replacement (which is also referred to as a "replacement request signal" below) to server 250. Yet-to-be-replaced battery 12 included in the subject vehicle is denoted as a "battery B1" below. The replacement request signal includes identification information (battery ID) of battery B1 mounted on the subject vehicle. The subject vehicle may make a request for battery replacement (S110) in accordance with an instruction from the user.

In S210, server 250 that has received the replacement request signal determines whether or not a prescribed replacement requirement is satisfied for the subject vehicle. Specifically, server 250 determines whether or not the replacement requirement is satisfied based on whether or not the battery ID received from the subject vehicle matches with the battery ID included in the battery request signal obtained from management center 500 (S23 in FIG. 3). In other words, when the battery ID of the subject vehicle has been registered (reserved), the replacement requirement is satisfied, and when the battery ID of the subject vehicle has not been registered (reserved), the replacement requirement is not satisfied.

When the replacement requirement is satisfied for the subject vehicle (YES in S210), in S220, server 250 sends a notification indicating permission to the subject vehicle and thereafter the process proceeds to S240. When the replacement requirement is not satisfied for the subject vehicle (NO in S210), on the other hand, in S230, server 250 transmits a notification indicating non-permission to the subject vehicle and thereafter the series of processing from S210 to S270 ends. In this case, the battery is not replaced.

After the subject vehicle transmits the replacement request signal (S110), it waits for a reply from server 250. When the subject vehicle then receives the reply from server 250, in S120, the subject vehicle determines whether or not battery replacement has been permitted. When the subject vehicle then receives the notification indicating permission (YES in S120), the process proceeds to S130. When the subject vehicle has received the notification indicating non-permission (NO in S120), on the other hand, the series of processing from S110 to S180 ends. In this case, the battery is not replaced.

In S130 and S240, the battery is replaced in a procedure which will be described later (see FIG. 5). The subject vehicle and server 250 may exchange information for battery replacement. Server 250 may obtain from the subject vehicle, information (for example, the specifications) on the battery mounted on the subject vehicle.

Battery 12 attached to the subject vehicle by battery replacement is denoted as a "battery B2" below. When replacement of the battery is completed, in S140, the subject vehicle inspects battery B2. In succession, in S150, the subject vehicle transmits a result of inspection to server 250. In succession, in S160, the subject vehicle determines whether or not the battery has successfully been replaced in accordance with the result of inspection. The subject vehicle determines that the battery has successfully been replaced unless abnormality (for example, defective connection or abnormal electrical performance) is found in the inspection, and determines that replacement of the battery has failed when abnormality is found in the inspection. Similarly, in S250, server 250 that has received the result of inspection also determines whether or not the battery has successfully been replaced in accordance with the result of inspection (normal/abnormal).

When the battery has successfully been replaced (YES in S160 and YES in S250), the subject vehicle and server 250 update the battery information held therein in S170 and S260, respectively, and thereafter the series of processing shown in FIG. 4 ends. When replacement of the battery has failed (NO in S160 and NO in S250), on the other hand, in S180 and S270, the subject vehicle and server 250 perform prescribed abnormality-addressing processing, respectively. The abnormality-addressing processing may include processing for notifying the user of the subject vehicle of failure in replacement of the battery. The abnormality-addressing processing may include processing for notifying management center 500 of failure in replacement of the battery. The abnormality-addressing processing may include processing for once detaching battery B2 attached to the subject vehicle from the subject vehicle and redoing replacement of the battery. After the abnormality-addressing processing is performed, the series of processing shown in FIG. 4 ends. The abnormality-addressing processing can freely be set.

Figure 5:
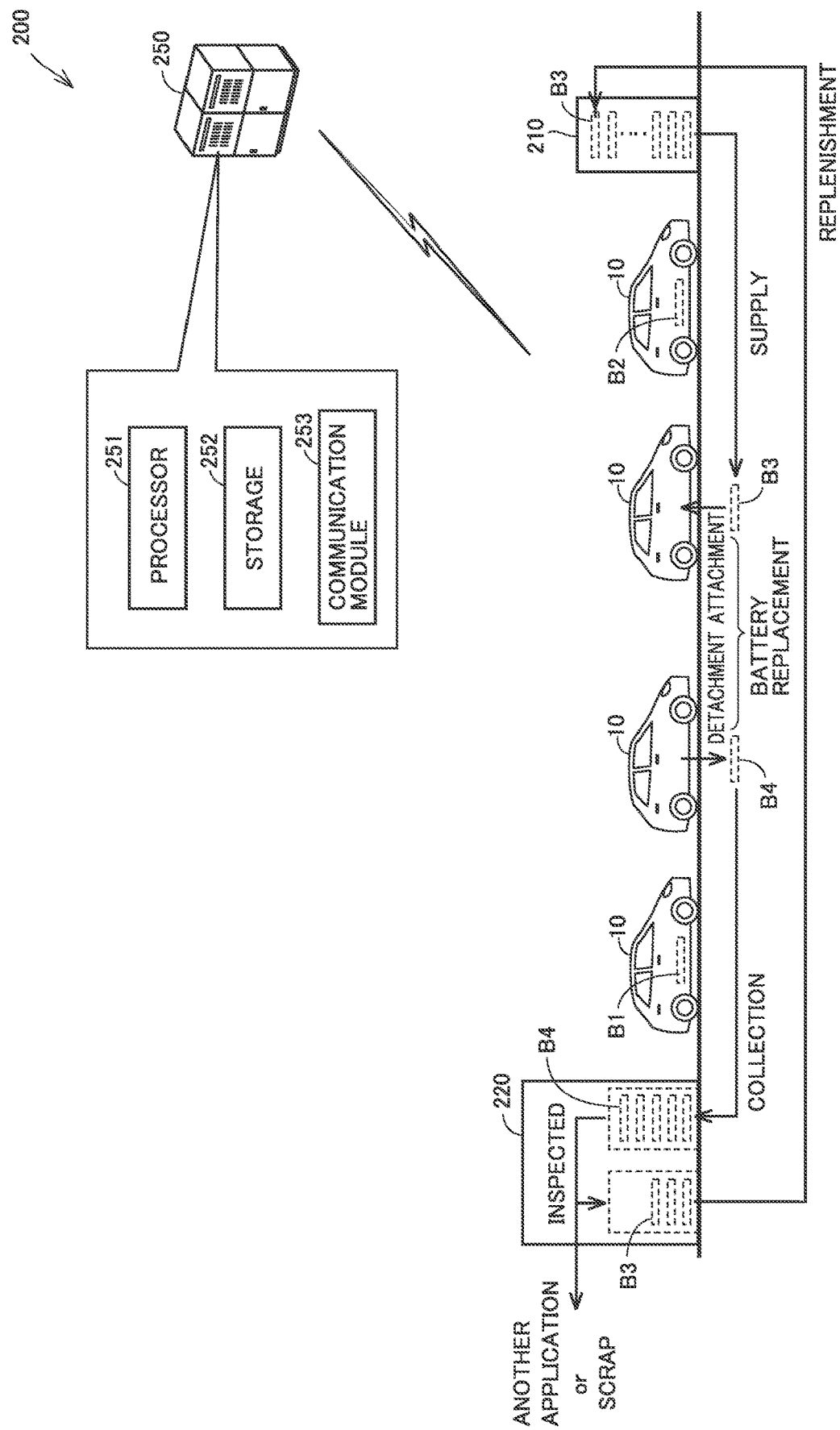
FIG. 5 is a diagram for illustrating a configuration and an operation of the replacement station included in the management system according to the embodiment of the present disclosure.

FIG. 5 is a diagram for illustrating a configuration and an operation of the battery replacement station (BSta 200) according to this embodiment.

Referring to FIG. 5 together with FIGS. 1 and 2, BSta 200 includes a storage apparatus 210, an inspection portion 220, and server 250. Storage apparatus 210 includes an accommodation portion (for example, a storage). Inspection portion 220 includes, for example, a charger-discharger, a measurement apparatus, and a categorization apparatus. BSta 200 further includes a transport apparatus that transports the power storage and a replacement apparatus that replaces the power storage. A type of transport may be a conveyor type or a type with the use of a delivery robot. Each of the transport apparatus and the replacement apparatus is controlled by server 250.

Server 250 includes a processor 251, a storage 252, and a communication module 253. Information on each battery present in BSta 200 is stored in storage 252 as being distinguished based on the identification information (battery ID) of the battery. The battery information held in server 250 includes, for example, specifications (for example, a capacity in an initial state, charging performance, and discharging performance), status information indicating a status of inspection, the SOH, and the SOC. The status information may indicate, for example, any status of yet-to-be-inspected, inspected (reuse), inspected (another application), inspected (scrap), and suppliable. Server 250 sequentially transmits information held therein to management center 500. The battery present in BSta 200 is a property of the automaker. A new battery may be supplied from a warehouse of the automaker to BSta 200 or a secondhand battery collected from vehicle 10 may be stored at BSta 200. The battery may be transported between a plurality of BSta's 200.

The subject vehicle is parked at a prescribed position in BSta 200, and thereafter requests server 250 to replace the battery (S110 in FIG. 4). In response to this request, server 250 starts control for battery replacement (S240 in FIG. 4). Server 250 has the battery of the subject vehicle replaced, for example, in a procedure as below.

Server 250 selects a battery (replacement battery) corresponding to battery B1 from among a plurality of batteries B3 accommodated in the accommodation portion of storage apparatus 210. Selected battery B3 is the same in specifications (for example, the capacity in the initial state, charging performance, and discharging performance) as battery B1. Battery B3, however, is lower in degree of deterioration than battery B1. The SOC of battery B3 is equal to or higher than a prescribed SOC value (for example, 50%).

In succession, the replacement apparatus detaches battery B1 from the subject vehicle. The battery detached from the subject vehicle is denoted as a "battery B4" below. In succession, the transport apparatus transports (supplies) battery B3 from storage apparatus 210 to the replacement apparatus. In succession, the replacement apparatus attaches supplied battery B3 to the subject vehicle. Battery replacement of the subject vehicle is thus completed.

BSta 200 performs a process for reuse of battery B4 detached from the subject vehicle, in parallel to the battery replacement process above. When battery B4 is detached from the subject vehicle, server 250 starts control for reuse of the battery. The reuse process is performed, for example, in a procedure as below.

The transport apparatus transports (collects) battery B4 to inspection portion 220. In succession, inspection portion 220 inspects collected battery B4. The charger-discharger and the measurement apparatus in inspection portion 220 conduct the inspection. Processing for recovery of the SOH may be performed on battery B4 before the inspection.

In the inspection, the charger-discharger has battery B4 discharged until the SOC attains to a prescribed first SOC value (for example, the SOC value indicating an empty state) and thereafter it has battery B4 charged until the SOC attains to a prescribed second SOC value (for example, the SOC value indicating the fully charged state). The measurement apparatus includes various sensors, and measures a state (for example, a temperature, a current, and a voltage) of battery B4 during charging. The measurement apparatus then detects the SOH of battery B4 based on measurement data. The measurement apparatus may further include a camera for inspection of an appearance.

When the inspection is completed, the categorization apparatus of inspection portion 220 categorizes battery B4 into a battery for reuse as a vehicle battery, a battery for use in another application (an application other than the application for the vehicle), and scrap, in accordance with a result of the inspection. Examples of other applications may include stationary use. The battery may be scrapped in any manner. In a process of scrap, the battery may be disassembled to a material level to collect a recyclable material (resource) for reuse of the material (resource recycle). The categorization apparatus may categorize battery B4 having a significantly damaged appearance into a non-reusable battery (another application or scrap).

Battery B4 which has been inspected (reuse) is handled as battery B3 described previously. After the inspection, the transport apparatus transports battery B3 to storage apparatus 210. Storage apparatus 210 is replenished with transported battery B3. Inspected and charged battery B3 is thus set in storage apparatus 210. Without being limited as such, storage apparatus 210 may be configured to charge inspected battery B3.

FIG. 5 shows an example where detachment of the battery and attachment of the battery are performed at different locations. The subject vehicle may be transported from a detachment position to an attachment position by a not-shown transport apparatus (for example, a transport apparatus of a conveyor type). Without being limited as such, detachment of the battery and attachment of the battery may be performed at the same location. The battery may be replaced (detached and attached) while the subject vehicle is at a standstill (for example, a parked state). The yet-to-be-replaced battery and the replaced battery do not essentially have to be the same in specifications. The vehicle-mounted battery may be replaced with a battery different in specifications. For example, the capacity of the vehicle-mounted battery may be increased as a result of battery replacement.

Figure 6:
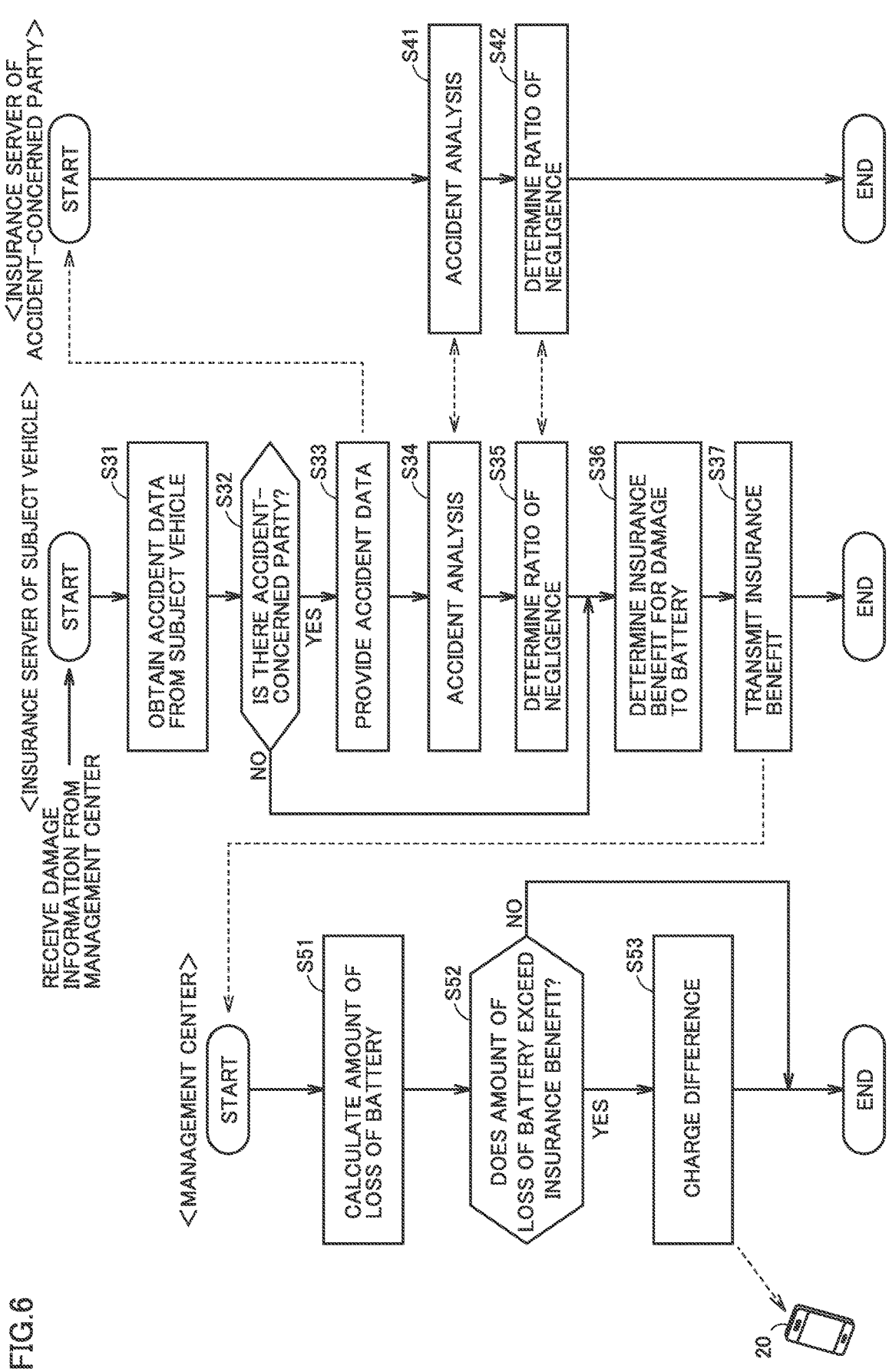
FIG. 6 is a flowchart showing processing involved with provision of an insurance service performed by an insurance server in the management method according to the embodiment of the present disclosure.

FIG. 6 is a flowchart showing processing involved with provision of the insurance service performed by insurance server 600 that has received the second management signal (S25 in FIG. 3) from management center 500.

Referring to FIG. 6 together with FIGS. 1 and 2, when insurance server 600 receives the second management signal (second damage information) and the identification information (vehicle ID) of the subject vehicle from management center 500, it starts a series of processing from S31 to S37.

In S31, insurance server 600 wirelessly communicates with the subject vehicle specified by the vehicle ID and obtains accident data indicating a status of the subject vehicle on the occurrence of the accident from the subject vehicle. Insurance server 600 may communicate with the subject vehicle through management center 500. The accident data includes, for example, video images in drive recorder 117c that show the status of the subject vehicle before and after the accident. In following S32, insurance server 600 determines whether or not there is a vehicle of an accident-concerned party based on the accident data. In the case of a single-car accident (single-vehicle accident), determination as NO (there is no vehicle of the accident-concerned party) is made in S32 and the process proceeds to S36.

When there is a vehicle of the accident-concerned party (YES in S32), in S33, insurance server 600 specifies a server of an insurance company (an insurance server of the accident-concerned party) that provides an insurance that covers the vehicle of the accident-concerned party and provides the accident data (S31) to the insurance server of the accident-concerned party. When insurance server 600 is unable to specify the insurance server of the accident-concerned party based on the accident data, it may request the user terminal (for example, portable terminal 20) of the subject vehicle to give information for specifying the insurance server of the accident-concerned party. Insurance server 600 may give a notification for explanation of circumstances to the insurance server of the accident-concerned party before it provides (transmits) the accident data.

When the accident data is shared between insurance server 600 and the insurance server of the accident-concerned party in the processing in S33, the insurance servers analyze the accident based on the accident data (S34 and S41), and a ratio of negligence of the user of the subject vehicle is determined based on a result of analysis of the accident (S35 and S42). Thereafter, the process proceeds to S36. As the ratio of negligence is higher, a degree of negligence is higher.

In S36, insurance service 600 determines insurance benefit to be paid under the insurance service based on the degree of damage (second damage information) to battery 12 mounted on the subject vehicle (the vehicle involved in the accident) and the ratio of negligence (S35) of the vehicle user in connection with the accident. Insurance server 600 may determine the insurance benefit with the use of a mathematical expression (for example, a mathematical expression in accordance with the insurance contract) showing relation among the degree of damage to the battery, the ratio of negligence in connection with the accident, and the insurance benefit.

In the case of the single-car accident (the single-vehicle accident), in S36, insurance server 600 may determine the insurance benefit based only on the degree of damage to battery 12. When it is found based on the accident data that the user has intentionally damaged battery 12, however, insurance server 600 may determine this case as being ineligible for coverage by the insurance (no insurance benefit).

In following S37, insurance server 600 transmits a signal (which is also referred to as an "insurance signal" below) indicating the vehicle ID of the subject vehicle and the insurance benefit determined in S36 to management center 500. The series of processing from S31 to S37 by insurance server 600 thus ends and a series of processing from S51 to S53 by management center 500 is started.

In S51, management center 500 obtains an amount of loss caused by the damage to battery 12 based on the battery information (for example, the specifications of battery 12) of the subject vehicle and the degree of damage (first damage information) to battery 12 indicated in the first management signal (S15 in FIG. 3). In following S52, management center 500 determines whether or not the amount of loss (S51) caused by the damage to battery 12 is larger than the insurance benefit indicated by the insurance signal. When the amount of loss caused by the damage to battery 12 is larger than the insurance benefit (YES in S52), in S53, management center 500 gives a notification to charge a difference (=the amount of loss−the insurance benefit) to the user terminal (for example, portable terminal 20) of the subject vehicle. When the amount of loss caused by the damage to battery 12 is equal to or smaller than the insurance benefit (NO in S52), on the other hand, management center 500 does not charge the difference to the vehicle user (S53).

As described above, the method of managing the power storage according to this embodiment includes processing shown in FIGS. 3, 4, and 6. In this embodiment, ECU 111 functions as the exemplary "computer apparatus" according to the present disclosure. The processing is performed by execution by at least one processor, of a program stored in at least one memory. The processing, however, may be performed by dedicated hardware (electronic circuitry) rather than software.

Vehicle 10 according to this embodiment performs the series of processing from S11 to S16 shown in FIG. 3. Vehicle 10 includes body 11, battery 12 (power storage) mounted on body 11, impactive force sensor 118b (first sensor), BMS 112a and strain sensor 112b (second sensor), position sensor 118a (third sensor), and ECU 111 (controller) that performs the management method (including S11 to S16 in FIG. 3) in connection with battery 12. ECU 111 determines whether or not vehicle 10 has been involved in an accident based on a result of detection by impactive force sensor 118b (S11). ECU 111 obtains the degree of damage to the power storage based on a result of detection by at least one of BMS 112a and strain sensor 112b (S12). When ECU 111 determines that vehicle 10 has been involved in the accident, it obtains a position of vehicle 10 involved in the accident based on the result of detection by position sensor 118a and transmits an emergency signal including the obtained vehicle position information and the battery damage information to at least one emergency vehicle 900 (S13). According to such a vehicle 10, on the occurrence of the vehicle accident, the state of vehicle 10 (in particular, the state of battery 12) involved in the accident can appropriately be conveyed to emergency vehicle 900 that deals with the accident.

In the embodiment, the insurance benefit associated with the damage to the power storage is calculated in a processing flow (see FIGS. 3 and 6) common to vehicle A (partial lease vehicle) and vehicle B (full lease vehicle). Without being limited as such, the insurance benefit may be calculated in processing flows different between vehicle A and vehicle B. For example, the processing in S14 in FIG. 3 may be modified such that determination as "YES" is made when the subject vehicle falls under vehicle A and determination as "NO" is made when the subject vehicle falls under vehicle B. In other words, the processing shown in FIG. 6 may be performed only for vehicle A. For vehicle B (full lease vehicle), insurance server 600 may provide the insurance service that compensates not only for the damage to the power storage but also for the damage to the body.

The processing shown in FIGS. 3 and 6 (S21 to S25 and S51 to S53) may be performed by server 150 (dealer terminal) instead of management center 500. Processing flows shown in FIGS. 3, 4, and 6 can be modified as appropriate. For example, depending on an object, the order of processing may be changed or an unnecessary step may be omitted. Contents in any processing may be modified. For example, in S15 in FIG. 3, the subject vehicle may transmit the first management signal including the accident data to management center 500. In S25 in FIG. 3, management center 500 may then transmit the second management signal including the accident data to insurance server 600. In such a form, S31 in FIG. 6 may be omitted. In a system in which a vehicle user involved in an accident himself/herself contacts an insurance company, the notification from management center 500 to insurance server 600 (S24 and S25 in FIG. 3) does not have to be given.

In the embodiment, vehicle 10 determines whether or not it has been involved in an accident. Without being limited to such a form, management center 500 instead of vehicle 10 may determine whether or not vehicle 10 has been involved in an accident. FIG. 7 is a flowchart showing a modification of the processing shown in FIG. 3.

Referring to FIG. 7 together with FIGS. 1 and 2, in this modification, in S14, ECU 111 of the subject vehicle determines whether or not battery 12 mounted on the subject vehicle is provided by the lease service without performing the processing in S11 to S13 (FIG. 3) described previously. When battery 12 of the subject vehicle is provided by the lease service (YES in S14), in S15A, ECU 111 obtains latest vehicle information and transmits a signal (which is also referred to as a "vehicle management signal" below) including the obtained vehicle information to management center 500 together with the identification information (vehicle ID) of the subject vehicle. Specifically, the vehicle management signal includes the position information of the subject vehicle, body data for determination as to whether or not the subject vehicle has been involved in an accident, and battery data for calculation of the degree of damage to battery 12 mounted on the subject vehicle. The position information of the subject vehicle includes data on the position of the subject vehicle detected by position sensor 118a. The body data includes data on impactive force applied to body 11 detected by impactive force sensor 118b. The battery data includes various types of data on battery 12 detected by BMS 112a and strain sensor 112b. When processing in S15A is performed, the process returns to the initial step (S14). Therefore, in each of vehicles A and B, the processing in S15A is repeatedly performed in prescribed cycles. In this modification, when determination as NO is made in S14, the processing in S15A is not performed. Therefore, in vehicle C, the processing in S15A is not performed.

When management center 500 receives the vehicle management signal and the vehicle ID (S15A), it starts a series of processing from S11A to S13A and from S21 to S23 which will be described below.

In S11A, management center 500 determines whether or not the subject vehicle has been involved in an accident based on the body data included in the vehicle management signal. Determination may be made in any manner, and for example, determination may be made as in S11 (FIG. 3) described previously. When it is determined that the accident has not occurred (NO in S11A), the series of processing by management center 500 ends.

When management center 500 determines that the accident has occurred (YES in S11A), in S12A, it obtains the degree of damage to battery 12 mounted on the subject vehicle (the vehicle involved in the accident) based on the battery data included in the vehicle management signal. The degree of damage to battery 12 may be obtained in any manner, and for example, it may be obtained as in S12 (FIG. 3) described previously. In following S13A, management center 500 transmits an emergency signal including the type of the subject vehicle, the position of the subject vehicle, the degree of damage to battery 12 (S12A), and the type of battery 12 (or the value of assessed influence depending on the type thereof) to at least one emergency vehicle 900. Management center 500 can obtain the information on the subject vehicle from the database stored in storage 520 based on the identification information (vehicle ID) of the subject vehicle. The position of the subject vehicle is included in the vehicle management signal.

Thereafter, the process proceeds to S21 to S23. These steps are the same as S21 to S23 shown in FIG. 3. This modification does not include S24 and S25 (FIG. 3). Without being limited as such, S24 and S25 may follow S21 to S23.

Vehicle 10 and management center 500 according to the modification can also appropriately convey the state of vehicle 10 (in particular, the state of battery 12) involved in an accident to emergency vehicle 900 that deals with the accident on the occurrence of the vehicle accident. In a form in which dealer 100 does not sell but merely leases the vehicle, determination in S14 (FIGS. 3 and 7) does not have to be made.

In this embodiment, management center 500, insurance server 600, server 150, and server 250 are each an on-premise server. Without being limited as such, the function of each server may be implemented on the cloud by cloud computing. In other words, these servers may be cloud servers. A location where the lease service is provided is not limited to dealer 100. For example, management center 500 may provide the lease service on-line (for example, on the cloud). Only a single lease type (for example, the partial lease type) may be provided.

Though only the battery is replaced in the embodiment, a battery pack including a battery and accessories thereof (for example, a BMS and a strain sensor) altogether may be replaced. The vehicle is not limited to a four-wheel passenger car, but may be a bus or a truck, or an xEV (electrically powered vehicle) with three wheels or at least five wheels. The vehicle may be provided with a solar panel. The vehicle may be configured to wirelessly be chargeable. The vehicle may be configured to be able to autonomous drive or may perform a flying function. The vehicle may be a vehicle (for example, a robo-taxi, an automated guided vehicle (AGV), or an agricultural machine) that can travel without human intervention.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method of managing a power storage comprising:
   determining whether a vehicle comprising a power storage has been involved in an accident;
   obtaining a degree of damage to the power storage when the vehicle is determined as having been involved in the accident;
   transmitting an emergency signal indicating the obtained degree of damage and a position of the vehicle involved in the accident to at least one of an emergency vehicle that deals with the accident and a management apparatus that instructs the emergency vehicle to be deployed; and
   controlling at least one replacement station based on the degree of damage and use form information,
   wherein the at least one replacement station is configured to replace the power storage, and
   the use form information indicates whether or not the power storage is provided by a lease service.

2. The method of managing a power storage according to claim 1, wherein
   the emergency signal further indicates a type of the power storage, and
   the method further comprising:
   dealing with the accident, by the emergency vehicle based on the type of the power storage.

3. The method of managing a power storage according to claim 1, wherein
   the emergency signal further indicates a type of the vehicle involved in the accident,
   the type of the vehicle involved in the accident comprises a battery electric vehicle, a plug-in hybrid electric vehicle, a hybrid electric vehicle, or a fuel cell electric vehicle, and
   the method further comprising:
   dealing with the accident, by the emergency vehicle, based on the type of the vehicle.

4. A computer apparatus comprising:
   a processor; and
   memory having recorded thereon a program that is executed by the processor to perform the method of claim 1.

5. A power storage management system that performs the method of managing a power storage according to claim 1, the power storage management system comprising:
   the vehicle comprising a controller; and
   a first server configured to provide the lease service for rental of the power storage for the vehicle, wherein
   the controller comprises memory configured to store the use form information,
   the controller is configured to:
   when the vehicle is determined as having been involved in the accident, obtain the degree of damage to the power storage,
   when the vehicle is determined as having been involved in the accident, determine, based on the use information, whether the power storage mounted on the vehicle is provided by the lease service, and when the power storage is determined as being provided by the lease service, transmit to the first server, first damage information indicating the degree of damage.

6. The power storage management system according to claim 5, wherein
   the at least one replacement station comprises a plurality of replacement stations, and
   the first server is configured to:
   determine whether the power storage mounted on the vehicle is to be replaced based on the first damage information, and
   in response to determining that the power storage is to be replaced, request at least one of the replacement stations among the plurality of replacement stations, specified based on the position of the vehicle, to secure a replacement power storage that replaces the power storage.

7. The power storage management system according to claim 5, further comprising a second server configured to provide an insurance service, wherein
when the first server receives the first damage information, the first server determines whether the power storage mounted on the vehicle is eligible for coverage by the insurance service, and when the first server determines that the power storage is eligible for coverage by the insurance service, the first server transmits to the second server, second damage information indicating the degree of damage.

8. The power storage management system according to claim 7, wherein
the second server is configured to perform, when the second server receives the second damage information,
obtaining accident data representing a situation at a time of occurrence of the accident,
determining a degree of negligence of a user of the vehicle in connection with the accident based on the obtained accident data, and
determining an insurance benefit to be paid by the insurance service based on the degree of damage indicated by the second damage information and the degree of negligence.

9. The power storage management system according to claim 5, wherein
the vehicle comprises:
a body on which the power storage is mounted;
a first sensor configured to detect an impactive force applied to the body;
a second sensor configured to detect at least one of an impactive force applied to the power storage and a state of the power storage;
a third sensor that detects a position of the vehicle, wherein
the controller is further configured to;
determine whether the vehicle has been involved in an accident based on a result of detection by the first sensor,
obtain the degree of damage to the power storage based on a result of detection by the second sensor, and
obtain the position of the vehicle involved in the accident based on a result of detection by the third sensor when the controller determines that the vehicle has been involved in the accident.

10. The power storage management system according to claim 5, wherein
the first server is configured to:
determine whether the vehicle has been involved in the accident based on data on an impactive force applied to the body, the data being obtained from the vehicle;
obtain the degree of damage to the power storage based on data on the power storage obtained from the vehicle; and
transmit the emergency signal to at least one of the emergency vehicle and the management apparatus.

11. The power storage management system according to claim 5, wherein
the controller is configured to obtain the degree of damage to the power storage based on a degree of a physical damage to a casing of the power storage.

12. The power storage management system according to claim 11, wherein
the vehicle further comprises:
a battery management system (BMS) configured to monitor the power storage; and
a temperature adjustment system configured to adjust a temperature of the power storage,
wherein the controller is configured to obtain the degree of damage to the power storage further based on a communication level in connection with the BMS, a degree of damage to an electrical component of the power storage, and a degree of damage to the temperature adjustment system.

13. The power storage management system according to claim 5, wherein
the vehicle further comprises:
a strain sensor configured to detect a degree of strain of a casing of the power storage; and
an impactive force sensor configured to detect an impactive force applied to the body,
wherein the controller is configured to:
determine that the vehicle has been involved in the accident based on the impactive force applied to the body detected by the impactive force sensor, and
obtain the degree of damage to the power storage based on the degree of strain of the casing detected by the strain sensor.

14. The power storage management system according to claim 5, further comprising a user terminal of the vehicle, wherein
the controller is configured to, when the power storage is determined as not being provided by the lease service, perform display control of the user terminal without transmitting the first damage information to the first server, and
the display control of the user terminal comprises:
determining contents of a manual; and
controlling the user terminal to display the manual comprising the determined contents.

15. The power storage management system according to claim 5, wherein
the at least one replacement station comprises a plurality of replacement stations,
the first server is configured to
determine whether the power storage mounted on the vehicle is to be replaced based on the first damage information, and
in response to determining that the power storage is to be replaced, transmit a battery request signal comprising a first identification information of the power storage to at least one of the replacement stations among the plurality of replacement stations,
in response to the at least one of the replacement stations among the plurality of replacement stations receiving the battery request signal, registering the first identification information included in the battery request signal in the at least one of the replacement stations among the plurality of replacement stations,
the at least one of the replacement stations among the plurality of replacement stations is configured to
determine, in response to the at least one of the replacement stations among the plurality of replacement stations receiving a replacement request signal comprising a second identification information of the power storage from the vehicle, whether or not a replacement requirement is satisfied for the vehicle based on whether or not the second identification information matches the first identification information,
replace the power storage mounted on the vehicle when the replacement requirement is satisfied for the vehicle, and not to replace the power storage mounted on the vehicle when the replacement requirement is not satisfied for the vehicle.

16. The method of managing a power storage according to claim 1, further comprising:

controlling a user terminal of the vehicle based on the degree of damage and the use form information.

17. The method of managing a power storage according to claim 1, wherein the use form information indicates a form of use of the vehicle, and the form of use of the vehicle comprises a partial lease vehicle, a full lease vehicle, or a sold vehicle, the partial lease vehicle comprises a body of the vehicle owned by a user and the power storage provided to the user by the lease service, the full lease vehicle comprises the body and the power storage provided to the user by the lease service, the sold vehicle comprises the body and the power storage owned by the user.

* * * * *